Aug. 22, 1967  S. ABRAMS  3,337,713
ELECTRIC SOLDERING GUN HAVING ADJUSTABLE ELECTRODES
Filed May 13, 1964

INVENTOR.
SOLOMON ABRAMS
BY *Robert Berliner*

United States Patent Office 3,337,713
Patented Aug. 22, 1967

3,337,713
ELECTRIC SOLDERING GUN HAVING
ADJUSTABLE ELECTRODES
Solomon Abrams, Detroit, Mich.
(14440 Park, Oak Park, Mich. 48237)
Filed May 13, 1964, Ser. No. 367,156
9 Claims. (Cl. 219—234)

This invention relates to soldering gun tip constructions. In particular, it relates to novel tips for transformer-type soldering guns.

Transformer-type soldering guns, utilizing replaceable heating elements or tips, have become very popular because of their ability to heat up fast and provide a source of high heat in a small space. A switch, usually in the form of a trigger, allows fast on and off control. In these respects, soldering guns are superior to soldering irons. However, while the tip itself reaches soldering temperatures in a short time, 2.5 to 5 seconds for some high quality guns, no great advantage is gained over soldering irons in heating the workpiece to be soldered. The contact point of the tip must be held against the workpiece until a "hot spot" develops on which the solder is placed. Thus, once the soldering tip is heated, soldering time is a function of the speed in which the workpiece can be heated.

Soldering time is important, especially in industry; for example, in the soldering of radio parts on an assembly line. One attempt to decrease soldering time involves using two separate heating elements, one on each side of the workpiece. Such a dual heat source procedure eliminates cold spots and does greatly speed up soldering time. However, until now, such procedures involved the use of two separate soldering irons, each with its individual power source. Also, only miniature and microminiature irons could be used; otherwise, the method was too clumsy for fast and accurate soldering. Thus, the amount of heat that could be applied was very limited.

Accordingly, it is an object of this invention to provide a method of soldering which is fast, efficient, and which eliminates cold spots. It is a further object to provide soldering gun tips which are cheaply manufactured and marketed and which allow a workpiece to be heated by being made part of the electrical circuit. A still further object is to provide a soldering gun tip composed of separate upper and lower portions, the contact ends of which are normally separated and which, in operation, grasp the object to be soldered as part of its electrical circuit. Other objects and advantages of this invention will be apparent as it is better understood from the following description which, taken in connection with the accompanying drawings, discloses preferred embodiments thereof.

Referring to the drawings.

Figure 1:
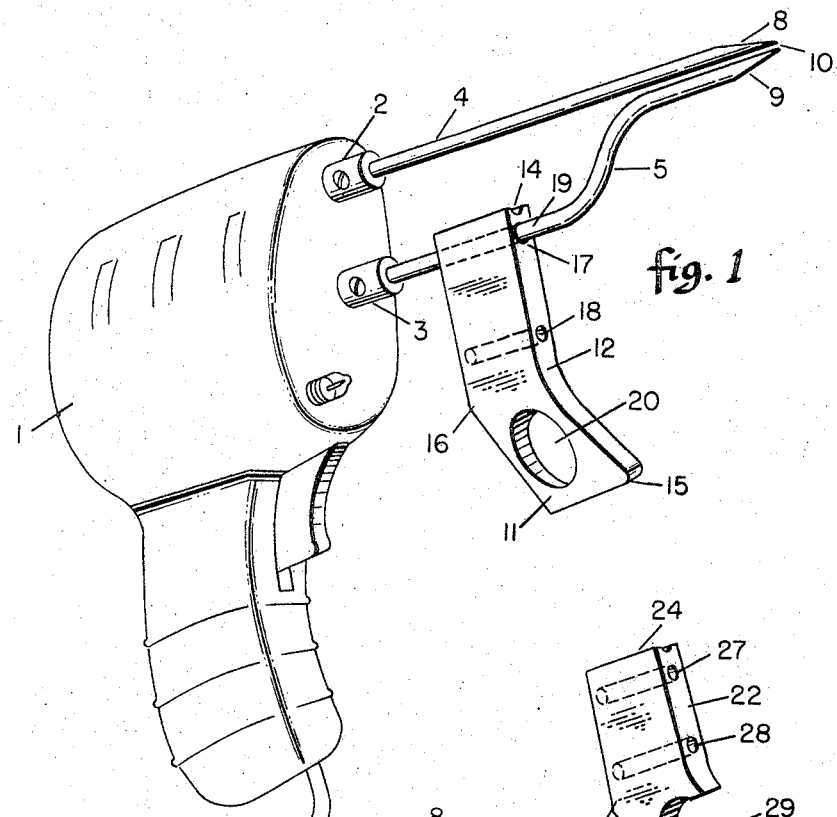
FIG. 1 is a perspective view of a transformer-type soldering gun containing the soldering gun tip of this invention.

Referring to the drawings, wherein the preferred embodiment is shown for the purpose of illustration only and not for the purpose of limitation, FIGURE 1 shows a transformer-type soldering gun 1 having dual tip sockets 2 and 3. A soldering gun tip, also shown in FIGURE 2, comprising an upper portion 4 and a lower portion 5, lies inserted in the sockets 2 and 3. Each tip portion has an insertion end 6 and 7 and a contact point 8 and 9. When so inserted, a gap 10 is present between the contact points 8 and 9. The upper tip portion 4 is shaped relatively straight whereas the lower tip portion 5 is curved upward at a point between its insertion end 7 and contact point 9 so as to approach the upper tip portion contact point 8. The tip portions 4 and 5, which function as electrodes in delivering the current through an object held between the contact points 8 and 9, can be made of any of the standard material used for tips with a transformer type soldering gun; e.g., copper, nickel plated copper, etc. The gap 10 is conveniently about one-eighth inch wide.

Figure 2:
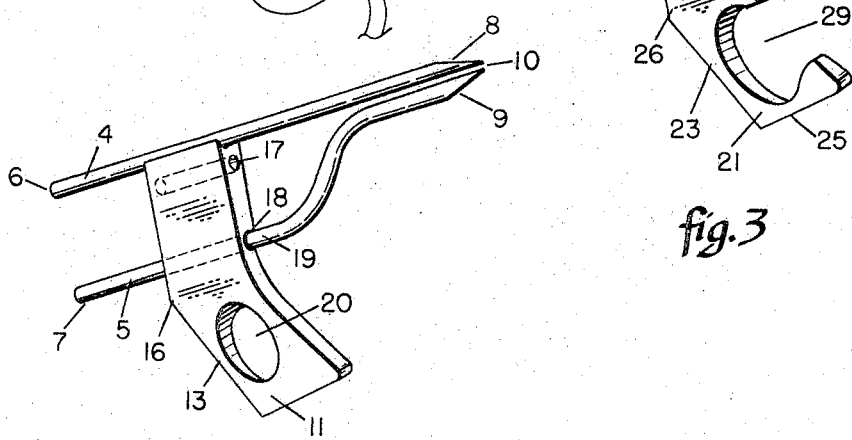
FIG. 2 is a perspective view of the soldering gun tip of this invention with the trigger 11 of FIG. 1 in an alternate position.

Attached to the lower tip portion 5, preferably before the point of curvature, is a trigger 11, also shown in FIGURE 2. The trigger 11 is preferably constructed in one piece of non-current-conducting material; e.g., of wood, fiberglass, plastic, etc. Plastics that can be used include polystyrene, styrene-acrylonitrile co-polymer, acrylic polymer, phenol-formaldehyde resin or any of the rigid solid organic plastics disclosed in "Modern Plastics Encyclopedia for 1963," vol. 40, No. 1A, published by Plastics Catalogue Corp. Solid, rigid rubber may also be used, such as sulfur vulcanized and non-vulcanized natural rubber, rubbery homopolymers of conjugated dienes and rubbery copolymers of a conjugated diene and a monoolefinic compound.

The trigger 11 preferably has side edges 12 and 13, a top edge 14 and a bottom edge 15. The two side edges are preferably curved in the same direction so that the top edge 14 and bottom edge 15 are not parallel. The curve is preferably sharp at a curvature point 16 which is somewhat between the top edge 14 and bottom edge 15.

In this embodiment, the trigger 11 is constructed so that its length is substantially greater than its width and its width; e.g., the space between edges 12 and 13, is substantially greater than the thickness of its edges 12–15. It contains an upper soldering gun tip receiving hole 17 extending from edge 12 to edge 13. The hole 17 is just wider than the thickness of the soldering gun tip portion 5 so that such tip portion can be frictionally received and secured in said hole 17. The tip receiving hole 17 is located just below the uppermost edge 14 of the trigger 11 and is normally used to secure the lower tip portion 5.

In a preferred embodiment, the trigger 11 has a second, lower, tip receiving hole 18 below the first, upper, tip receiving hole 17 and just above the curvature point 16. The distance between the center of the lower tip receiving hole 18 and the uppermost edge 14 of the trigger 11 corresponds to the distance between the center of the lower tip portion 5 and the bottom of the upper tip portion 4 at a point 19 on the lower tip portion 5 where said lower tip portion 5 is frictionally received in the trigger 11; i.e., a distance corresponding to that between the parallel portions of the upper and lower tip portions 4 and 5. The presence of the lower tip receiving hole 18 allows the maintenance of the gap 10 when the lower tip portion 5 is frictionally secured in the lower tip receiving hole 18 and the upper tip portion 4 is held stationary on the uppermost edge 14 of the trigger 11. For this reason, the uppermost edge 14 of the trigger 11 is preferably shaped, e.g., curved concave, to correspond with the shape of the bottom 30 of the upper tip portion 4.

The trigger 11 contains a finger slot 20 through which the trigger 11 may be grasped and which is located just below the curvature point 16, extending toward the bottom edge 15.

Figure 3:
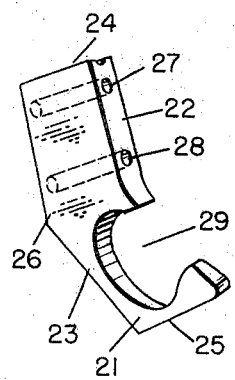
FIG. 3 is a side elevation of another trigger.

FIGURE 3 shows another version of a trigger 21 that can be used. The trigger 21 has side edges 22 and 23, an upper edge 24, lower edge 25, curvature point 26, upper and lower tip receiving holes 27 and 28, and finger slot 29. In this version, the finger slot 29 is not completely enclosed as it is in FIGURE 2. Rather, it is open and more accessible.

In one method of operation, the insertion end 6 of the upper tip portion 4 is inserted into and held by the soldering gun tip socket 2. The lower tip portion 5 is inserted through, and frictionally secured by, the upper receiving hole 17 of the trigger 11 so that the curvature of the trigger 11 is toward the contact point 9, and the insertion end 7 is inserted into and held by the soldering gun tip socket 3. A gap 10 is thereby present between the contact points 8 and 9.

By holding the soldering gun 1 in one's hand with one finger on the switch 31 of the gun and another finger in the slot 20 of the trigger, complete soldering control can be attained. The workpiece, wire, etc., to be soldered is placed within the gap 10. If the workpiece is larger than the gap 10, the trigger 11 can be pulled inward, toward the gun 1, to widen the gap 10. If the workpiece is smaller than the gap 10, the trigger 11 can be pushed outward, away from the gun 1, to narrow the gap 10 and secure the workpiece between the contact points 8 and 9. Thus, the workpiece becomes part of the circuit. The switch 31 on the gun 1 is then depressed, heating the workpiece in an extremely fast time. The solder can be immediately applied. Thus, two pieces of wire to be soldered can be placed between the contact points 8 and 9, the switch 31 pressed and solder immediately applied. This method is much faster than methods previously used. It completely eliminates cold spots on the workpiece and allows the solder to be placed on the workpiece immediately.

In another method of operation, where the workpiece is larger than gap 10, the lower tip portion 5 is inserted through, and frictionally secured by, the lower receiving hole 18 of the trigger 11, instead of the upper hole 17, and its insertion end 7 is inserted into and held by the soldering tip socket 3. By this arrangement, the upper tip portion 4 rests on the uppermost edge 14 of the trigger 11 and the gap 10 is held uniform until the trigger 11 is moved inward toward the gun 1.

This invention has been described in connection with preferred embodiments thereof. It will be appreciated that modifications and alterations in these preferred embodiments will occur to others upon a reading and understanding of this specification. It is my intention to include all such modifications and alterations insofar as they come within the scope of the appended claims.

I claim:

1. In combination, an electric soldering gun having a pistol grip handle and two electrode holders, an upper electrode and a lower resilient electrode in said holders, a trigger member attached to the lower electrode in a position forwardly of the pistol grip handle and dependent downwardly from the lower electrode, and means on said trigger slideably receiving the lower electrode.

2. The combination of claim 1 wherein said means on the trigger slideably receiving the lower electrode is a bore through said trigger.

3. A soldering gun tip comprising separate upper and lower resilient portions, each of said portions having a contact point on one end and an insertion end for use in an electric soldering gun having a pair of terminal sockets for receiving the insertion ends of the upper and lower tip portions and holding the insertion ends in fixed position such that when said insertion ends lay inserted in the soldering gun a gap is present between said contact points; and means for controlling the width of the gap comprising a trigger containing a receiving hole for securing the trigger to the lower tip portion at a point between the insertion end and contact point of the lower tip portion so that the trigger is attached directly to, and vertically movable with respect to the longitudinal axis of, the lower tip portion so as to thereby allow control of the gap width, the distance between the axial center of the receiving hole and the uppermost edge of the trigger corresponding to the distance between the axial centerline of the lower tip portion and the bottom surface of the upper tip portion at the point of attachment of the trigger.

4. The soldering gun tip of claim 3 wherein the uppermost edge of the trigger is shaped to correspond with the bottom of the upper tip portion.

5. The soldering gun tip of claim 4 wherein the trigger is constructed in one piece from non-current-conducting material.

6. A trigger, adapted for use in a work-in-circuit type soldering gun having a pair of electrodes defining a work-receiving gap, one of the electrodes directly carrying the trigger, containing a finger slot at one end, a top edge parallel to the longitudinal axis of the electrodes and an electrode receiving hole between the finger slot and said top edge and having its roof spaced from the top edge a distance corresponding between the electrodes at the point of trigger attachment.

7. In combination, an electric soldering gun, soldering gun tip and trigger therefor,
the tip comprising separate upper and lower resilient rods of electrical conducting material, each rod having a contact point on one end and an insertion end,
the soldering gun having a pair of terminal sockets for receiving the insertion ends and holding them in fixed position, and
the trigger having a receiving hole therein for receipt of the lower rod so as to attach directly to the lower rod and be vertically movable with respect to the longitudinal axis of the lower rod so as to thereby allow control of separation of the rods, the receiving hole extending along the longitudinal axis of the lower rod at a point between its insertion and the contact point, the distance between the axial center of the receiving hole and the uppermost edge of the trigger corresponding to the distance between the axial centerline of the lower tip portion and the bottom surface of the upper tip portion at the point of attachment of the trigger.

8. The combination of claim 7 wherein the upper most edge of the trigger is shaped to correspond with the bottom of the upper tip portion.

9. The combination of claim 8 wherein the trigger is constructed in one piece from non-current-conducting material.

References Cited

UNITED STATES PATENTS

| | | | |
|---|---|---|---|
| 1,630,990 | 5/1927 | Wagg | 219—232 |
| 1,884,066 | 10/1932 | Meadowcroft | 219—90 |
| 2,251,779 | 8/1941 | Bourque | 219—141 |
| 2,371,664 | 3/1945 | Workman | 219—90 |
| 2,677,039 | 4/1954 | Clark | 219—234 X |
| 2,747,063 | 5/1956 | Waring | 219—90 |
| 2,765,390 | 10/1956 | Chapel et al. | 219—235 X |
| 2,789,198 | 4/1957 | Dye et al. | 219—234 X |
| 3,050,618 | 8/1962 | Fischer | 219—90 |
| 3,152,239 | 10/1964 | Faulconer | 219—234 |

FOREIGN PATENTS

| | | |
|---|---|---|
| 164,171 | 10/1949 | Austria. |
| 920,926 | 12/1954 | Germany. |
| 556,835 | 10/1943 | Great Britain. |

ANTHONY BARTIS, *Primary Examiner.*